US005879219A

United States Patent [19]

Penjuke

[11] Patent Number: 5,879,219

[45] Date of Patent: Mar. 9, 1999

[54] BALLOON INFLATION AND ILLUMINATION DEVICE

[76] Inventor: Daniel Penjuke, 64 Albert Ave., Aldan, Pa. 19018

[21] Appl. No.: 785,176

[22] Filed: Jan. 17, 1997

[51] Int. Cl.[6] .............................. A63H 3/00; B60C 29/00; F21V 33/00

[52] U.S. Cl. .......................... 446/222; 446/485; 137/853; 362/96; 362/253

[58] Field of Search ..................................... 446/220, 222, 446/224, 485; 137/853; 362/253, 96, 101

[56] References Cited

U.S. PATENT DOCUMENTS

| | | | |
|---|---|---|---|
| 1,530,923 | 3/1925 | Annas | 446/224 |
| 4,292,999 | 10/1981 | Szollman | 137/560 |
| 4,542,445 | 9/1985 | Marletta | 362/96 |
| 4,737,133 | 4/1988 | Neumeier | 446/397 |
| 4,794,498 | 12/1988 | Neumeier | 362/185 |
| 4,911,674 | 3/1990 | Cole | 446/224 |
| 5,016,154 | 5/1991 | Leeyeh | 362/414 |
| 5,083,250 | 1/1992 | Malcolm | 362/253 |
| 5,119,281 | 6/1992 | Akman | 362/253 |
| 5,499,941 | 3/1996 | Penjuke | 446/222 |

FOREIGN PATENT DOCUMENTS

| | | | |
|---|---|---|---|
| 168367 | 5/1951 | Australia | 362/253 |
| 405137847 | 6/1993 | Japan | 446/485 |

*Primary Examiner*—Robert A. Hafer
*Assistant Examiner*—Laura Fossum
*Attorney, Agent, or Firm*—LaMorte & Associates P.C.

[57] ABSTRACT

An improved device for inflating and illuminating a balloon. The device includes a hollow tube having an air baffle structure integrally molded in its interior. The air baffle structure directs air flowing through the tube out through side openings and into a surrounding balloon. A small aperture also extends through the air baffle structure itself. The aperture is sized so that a double lead wire can pass though the aperture from one side of the air baffle structure to the other. The double lead wire extends past the air baffle structure and is directly coupled to an illumination source at the top end of the tube. A sealant is used to seal the aperture through which the double lead wire passes. As such, an air impervious air baffle structure is provided that allows for the direct electrical connection in between a light source on one side of the air baffle structure and a power supply on the opposite side of the air baffle structure.

9 Claims, 3 Drawing Sheets

BALLOON INFLATION AND ILLUMINATION DEVICE

BACKGROUND OF THE INVENTION

1. FIELD OF THE INVENTION

The present invention relates to devices capable of being positioned within a balloon that assist in the inflation of the balloon and enable the balloon to be illuminated internally. More particularly, the present invention relates to devices that retain a light source within a balloon and couple that light source to an external power source after the balloon is inflated.

2. PRIOR ART STATEMENT

U.S. Pat. No. 5,499,941 to Daniel Panjuke, the inventor herein, entitled Balloon Inflation Device With Light, discloses a device for positioning a light within a traditional latex balloon. Referring to FIG. 1, it can be seen that the device described in U.S. Pat. No. 5,499,941 to Panjuke contains a hollow tube 12 that passes into the opening of a latex-type of balloon. A flange 14 is disposed near the bottom of the hollow tube 12. The open end of a balloon passes over the flange 14, thereby creating an air impervious seal around the hollow tube 12. To fill the balloon, air is introduced into the balloon through the hollow tube 12. A baffle 16 is positioned in the hollow tube 12. Two holes 18 are positioned adjacent to the baffle 16. As air is introduced through the bottom of the hollow tube 12, the air is directed through the two holes 18 and into the balloon by the baffle 16. The presence of an elastic band 20 enables air to pass into the balloon through the two holes 18 yet prevents air from leaving the balloon through those same holes 18.

A light bulb 22 connects to the top of the hollow tube 12. As the bulb 22 is placed into the top of the hollow tube 12, the specialty leads 24 of the bulb 22 contact two terminals 26 disposed on the interior of the hollow tube 12. The terminals 26 extend down the length of the hollow tube 12 and interconnect with an electrical plug 27 that leads to a power source.

In the prior art, the manufacturing of the terminals 26 on the interior of the hollow tube 12 have been problematic. The terminals 26 must be firmly affixed to the interior of the hollow tube 12. Furthermore, the terminals 26 must extend down the sides of the baffle 16 in the hollow tube 12 without allowing air to leak past the baffle 16. In order to achieve such a configuration, the baffle 16 cannot be molded as part of the hollow tube. Rather, the baffle 16 must be glued in place within the hollow tube 12 after the terminals 26 have be affixed to the sides of the hollow tube 12. The use of the terminals 26 also requires that the light bulb 22 and the electrical plug 27 be specially configured to contact and engage the terminals 26 inside the hollow tube 12. All such requirements have added greatly to the cost and labor required to manufacture the overall device.

A more specific description of the operation of the prior art device shown in FIG. 1 is contained in U.S. Pat. No. 5,499,941 to Daniel Panjuke, entitled Balloon Inflation Device With Light, the disclosure of which is incorporated herein by reference.

In view of the prior art, as exemplified by U.S. Pat. No. 5,499,941, a need therefore exists in the art for an improved balloon and inflation device that does not use interior terminals to connect the light source to a power source. Such an improved device would greatly reduce the complexities of manufacturing and would result in a device that is less costly and less labor intensive to produce. This need is satisfied by the present invention as described and claimed.

SUMMARY OF THE INVENTION

The present invention is an improved device for inflating and illuminating a balloon. The device includes a hollow tube having an air baffle structure integrally molded in its interior. The air baffle structure directs air flowing through the tube out through side openings and into a surrounding balloon. A small aperture also extends through the air baffle structure itself. The aperture is sized so that a double lead wire can pass though the aperture from one side of the air baffle structure to the other. The double lead wire extends past the air baffle structure and is directly coupled to an illumination source at the top end of the tube. A sealant is used to seal the aperture through which the double lead wire passes. As such, an air impervious air baffle structure is provided that allows for the direct electrical connection in between a light source on one side of the air baffle structure and a power supply on the opposite side of the air baffle structure. This results in a balloon inflation and illumination device that is lighter, lower in cost, easier to manufacture and more reliable than those available in the prior art.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 2:
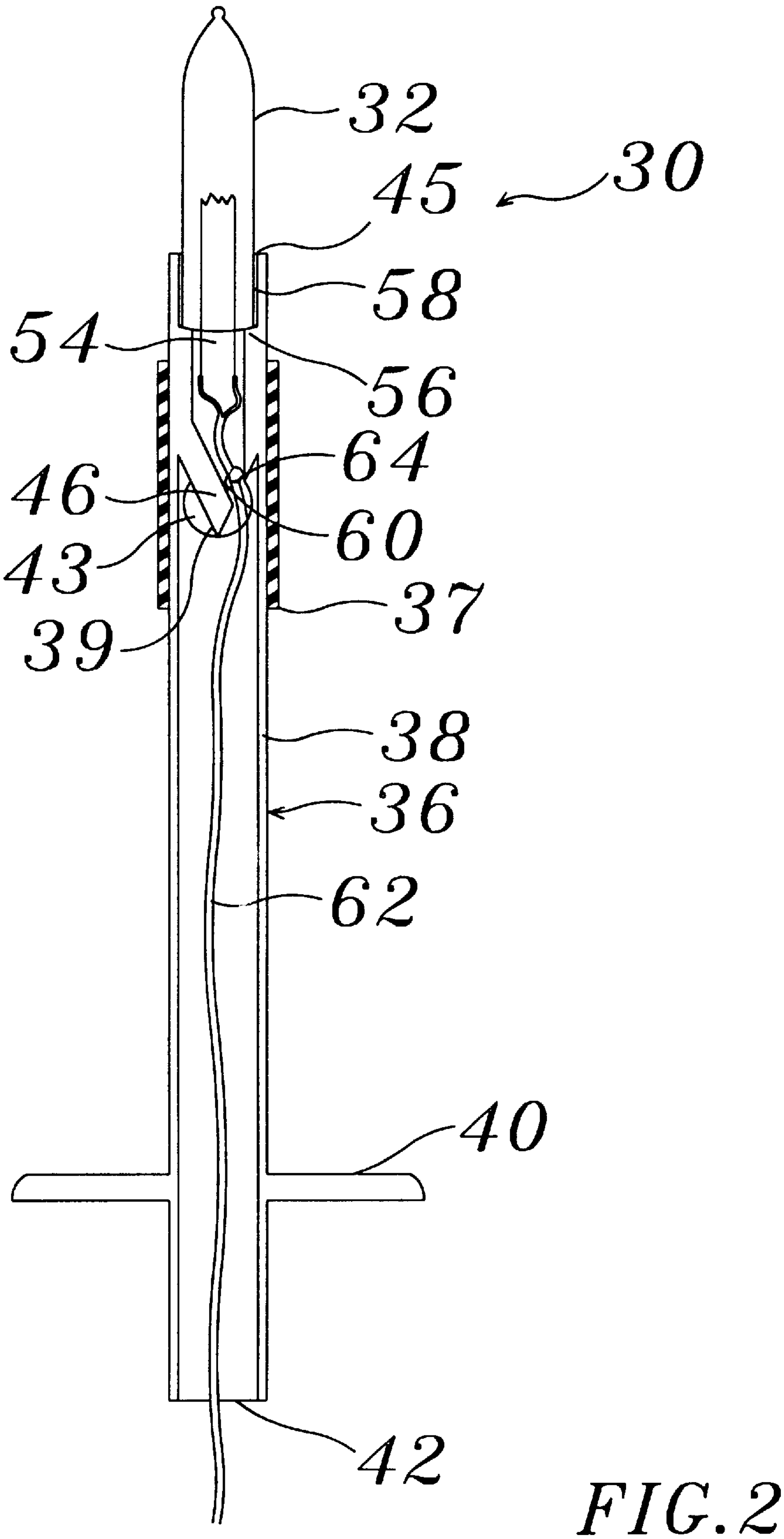
FIG. 2 is a cross-sectional view of one preferred embodiment of the present invention balloon inflation and illumination device.
Figure 3:
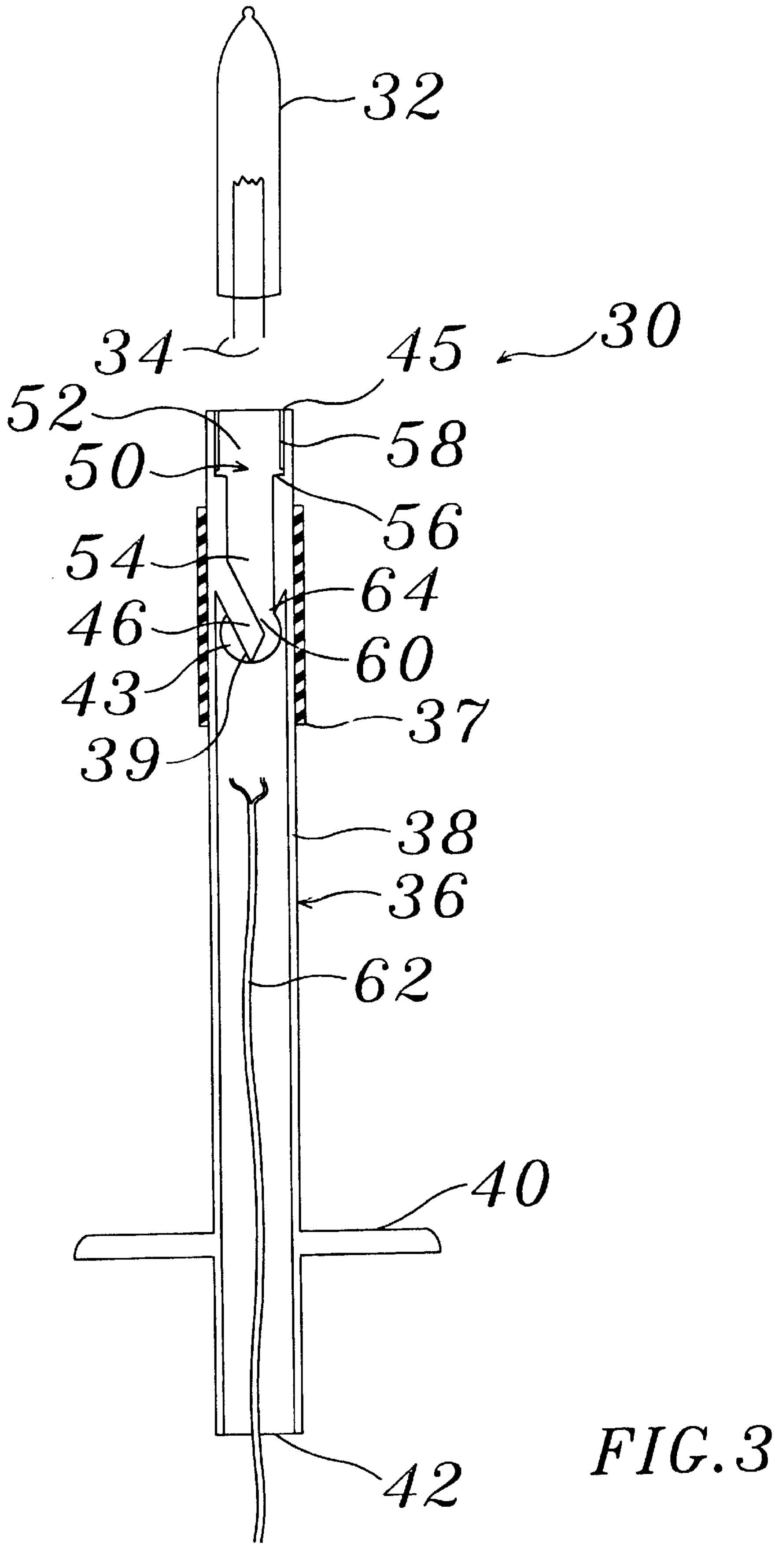
FIG. 3 is an exploded cross-sectional view of the embodiment shown in FIG. 2.

Referring to FIG. 2 and FIG. 3, a first embodiment of the present invention balloon inflation and illumination device 30 is shown. In the shown embodiment, a conventional incandescent bulb 32 is used as a light source. The incandescent bulb 32 is manufactured with two long conductive leads 34 (FIG. 3) that extend into the bulb 32 and connect to the filament within the bulb 32. The bottom end of the long conductive leads 34 extend well into the hollow tube 38 as will later be explained. The use of an incandescent bulb 32 is preferred but is not required. Other light sources such as light emitting diodes (LEDs) and the like can also be used. The use of an incandescent bulb 32 is preferred because of its low cost and high degree of light output.

Figure 1:
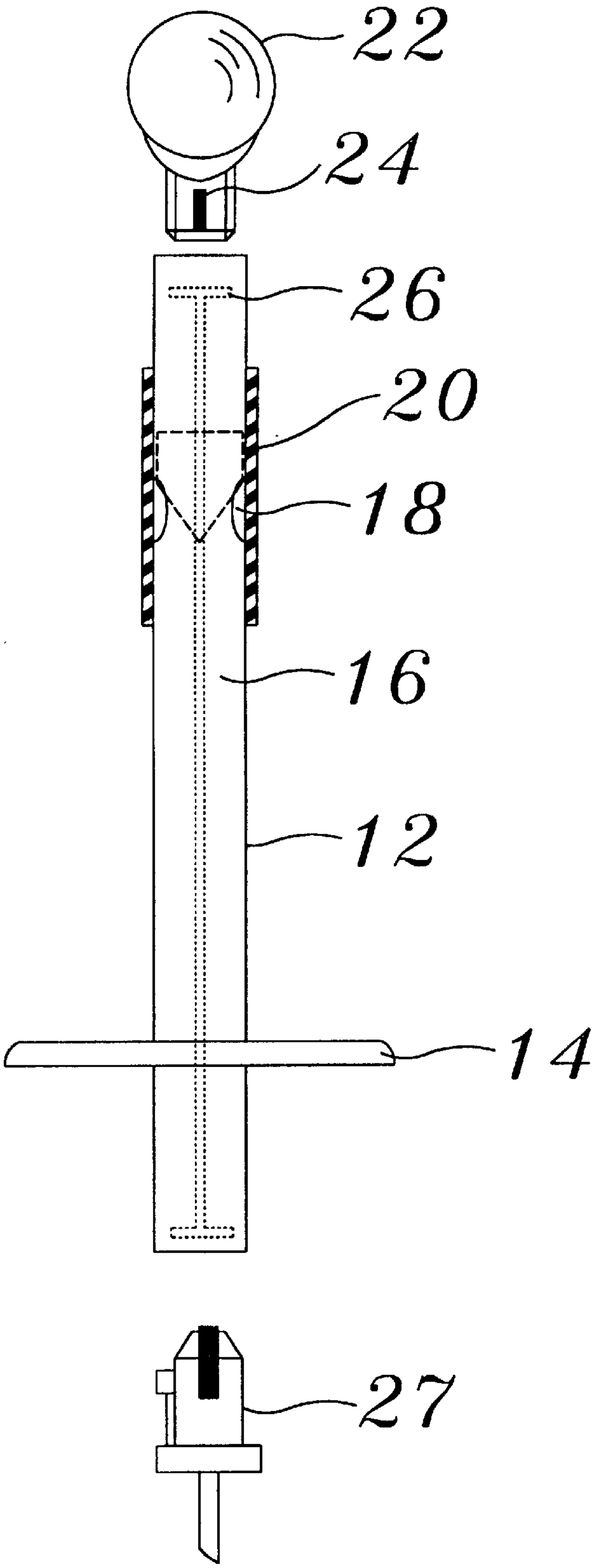
FIG. 1 (PRIOR ART)
FIG. 1 is a partially cross-sectioned and exploded front view of a prior art balloon inflation and illumination device.

The incandescent bulb 32 is retained at one end of an elongated support 36. The elongated support 36 is comprised in part of an elongated hollow tube 38. A flange 40 is disposed on the exterior of the hollow tube 38 near its bottom end 42. The purpose of the flange 40 is to seal the opening of a balloon, as is done in the prior art device of FIG. 1.

At least two side holes 43 are formed through wall of the hollow tube 38 at a point below the top end 45 of the hollow tube 38. An elastic element 37 surrounds the side holes 43. The elastic element 37 acts as a one way valve by allowing gas to leave the hollow tube 38 through the side holes 43 but not allowing gas to enter the hollow tube 38 through the side holes 43. From the point of the side holes 43 upward, a baffle structure 46 is disposed within the interior of the hollow tube 38. The baffle structure 46 is integrally molded as part of the hollow tube 38. As such, the hollow tube 38 and baffle structure 46 are formed together in a single molding operation. This eliminates the need for a separate baffle and eliminates both the time and labor required to install a separate baffle. The baffle structure 46 facing the bottom end 42 of the hollow tube 38 is substantially conical in shape. As such, a sloped surface 39 of the conical shape is positioned adjacent each of the side holes 43. The sloped surface 39 of the conical shape directs air flowing up through the hollow tube 38 out through the side holes 43 and into a surrounding balloon.

A bulb receptacle 50 (FIG. 3) is disposed proximate the top end 45 of the hollow tube 38. The bulb receptacle 50 is a cup shaped structure that extends between the open top end 45 of the hollow tube 38 and the baffle structure 46. The bulb receptacle 50 is divided into two sections. The top section 52 (FIG. 3) has a wide interior that communicates with the open top end 45 of the hollow tube 38. Below the top section 52 is the narrower bottom section 54. A ridge 56 is located at the point of transition between the top section 52 of the bulb receptacle 50 and the bottom section 54. The ridge 56 acts as a rest for the bottom of the incandescent bulb 32, thereby enabling the bulb 32 to be easily positioned at the proper depth within the bulb receptacle 50. Adhesive 58 may be applied within the top section 52 of the bulb receptacle 50. The adhesive 58 bonds to the incandescent bulb 32 and helps to form an air impervious seal in between the hollow tube 38 and the incandescent bulb 32.

The bottom section 54 of the bulb receptacle 50 is tapered, wherein the taper leads to a small aperture 60 that extends through the baffle structure 46. A double lead wire 62 extends into the hollow tube 38 through its open bottom end 42. The double lead wire 62 extends through the aperture 60 in the baffle structure 46 and leads into the bulb receptacle 50. Once through the aperture 60 in the baffle structure 46, the double lead wire 62 is knotted into a knot 64 (FIG. 2) that is larger than the aperture 60. Consequently, the knot 64 acts as a locking device that prevents the double lead wire 62 from being pulled out of the hollow tube 38 past the baffle structure 46. A small amount of adhesive (not shown) is added to the knot 64. The adhesive serves two purposes. First, the adhesive locks the knot 64 in place over the aperture 60. Second, the adhesive creates an air impervious seal in between the knot 64 and the aperture 60. As a result, no air flows through the aperture 60 past the knot 64. The double lead wire 62 extends out of the hollow tube 38 and leads to a battery source (not shown) that provides electrical power to the incandescent bulb 32. The double lead wire 62 may also extend to a control circuit (not shown) that may cause the incandescent bulb 32 to blink in sequence by selectively controlling the flow of electricity in between the battery source and the incandescent bulb.

The leads of the double lead wire 62 connect to the conductive leads 34 of the incandescent bulb 32 within the bulb receptacle 50. In the preferred embodiment, the wire leads are soldered to the conductive leads 34 of the incandescent bulb 32, thereby creating a strong, reliable electrical connection.

The integral baffle structure 46 of the present invention eliminates the cost and labor of manufacturing and installing a separate baffle structure. Furthermore, the presence of an aperture 60 in the baffle structure 46 eliminates the need for separate conductive leads in the hollow tube. Since no separate conductive leads are required, a specialty bulb and a specialty wire connector that engage the conductive leads in the hollow tube are not required. The improved design set forth by the present invention therefore creates significant cost and labor savings over that available in the prior art.

It will be understood that the embodiment of the present invention described and illustrated herein is merely exemplary and a person skilled in the art can make many variations to the embodiment shown without departing from the scope of the present invention. There are many different balloon shapes and styles that may be illuminated. Since many differently shaped balloons exist, it will be understood that the shape and length of the present invention illumination device can be altered in order for the illumination device to properly position a light source near the center of the balloon. All such variations, modifications and alternate embodiments are intended to be included within the scope of the present invention as defined by the appended claims.

What is claimed is:

1. An illumination device for a balloon, comprising:

an illumination source;

a tube having a first end and an opposite second end and at least one side hole disposed in said tube between said first end and said second end, wherein said first end of said tube is adapted to receive and retain said illumination source in a fixed orientation;

a baffle structure having at least one sloped surface that is disposed within said tube proximate said at least one side hole, wherein said at least one sloped surface directs gas flowing in said tube from said second end through said at least one side hole, said baffle structure further including an aperture disposed there through;

a wire extending through said hollow tube and past said baffle structure through said aperture, wherein said wire is electrically coupled to said illumination source;

an elastic element disposed around said tube covering said at least one side hole, wherein said elastic element enables the outward flow of gas from inside said tube through said at least one side hole and prevents the inward flow of gas from outside said tube through said at least one side hole; and wherein said baffle structure and said tube are integrally molded from the same material as a single unit.

2. The device according to claim 1, further including an air impervious seal disposed between said aperture and said, wire wherein said air impervious seal obstructs the flow of air through said aperture.

3. The device according to claim 1, wherein said wire is knotted above said aperture in said baffle structure forming a knot that is larger than said aperture.

4. The device according to claim 1, further including adhesive disposed between said tube and said illumination source, whereby said adhesive retains said illumination source in said fixed position.

5. The device according to claim 1, wherein said illumination source is selected from a group consisting of incandescent bulbs and light emitting diodes.

6. The device according to claim 1, wherein said illumination source is an incandescent bulb having a bulb and two leads that extend from said bulb, wherein said two leads pass into said tube and said wire is directly coupled to said leads within said tube.

7. The device according to claim 6, wherein said wire is soldered to said leads of said incandescent bulb within said tube.

8. The device according to claim 1, wherein said illumination source has a bottom edge and a ridge is disposed in said tube proximate said top end, wherein said bottom edge of said illumination source rests against said ridge when said illumination source is at said fixed orientation.

9. The device according to claim 1, further including a flange radially extending from said tube proximate said bottom end of said tube.

* * * * *